United States Patent
Gramann et al.

(10) Patent No.: US 12,191,727 B2
(45) Date of Patent: Jan. 7, 2025

(54) ELECTRIC MACHINE AND METHOD FOR OPERATING THE SAME

(71) Applicant: Schaeffler Technologies AG & Co. KG, Herzogenaurach (DE)

(72) Inventors: Matthias Gramann, Renchen (DE); Christian Nolte, Hassfurt (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 710 days.

(21) Appl. No.: 17/311,402

(22) PCT Filed: Nov. 27, 2019

(86) PCT No.: PCT/DE2019/101015
§ 371 (c)(1),
(2) Date: Jun. 7, 2021

(87) PCT Pub. No.: WO2020/114552
PCT Pub. Date: Jun. 11, 2020

(65) Prior Publication Data
US 2022/0029489 A1   Jan. 27, 2022

(30) Foreign Application Priority Data

Dec. 7, 2018 (DE) .......................... 102018131412.4
Jan. 28, 2019 (DE) .......................... 102019101964.8

(51) Int. Cl.
*H02K 3/28* (2006.01)
*H02K 11/20* (2016.01)

(52) U.S. Cl.
CPC ............... *H02K 3/28* (2013.01); *H02K 11/20* (2016.01); *H02K 2213/09* (2013.01); *H02K 2213/12* (2013.01)

(58) Field of Classification Search
CPC ...... H02K 3/28; H02K 11/20; H02K 2213/09; H02K 2213/12; H02K 2213/06
See application file for complete search history.

(56) References Cited

U.S. PATENT DOCUMENTS

| | | |
|---|---|---|
| 2,486,195 A | 10/1949 | Munsey |
| 6,899,568 B2 | 5/2005 | Caines |
| 2005/0045392 A1 | 3/2005 | Maslov et al. |

(Continued)

FOREIGN PATENT DOCUMENTS

| | | |
|---|---|---|
| CN | 1330807 A | 1/2002 |
| CN | 104779754 A | 7/2015 |

(Continued)

*Primary Examiner* — Christopher M Koehler
*Assistant Examiner* — Riley Owen Stout
(74) *Attorney, Agent, or Firm* — Volpe Koenig (57) ABSTRACT

An electric machine having a stator and a rotor is divided into sub-machine systems by winding sections of the stator or rotor that can be switched separately for each phase. A winding section of each phase is assigned to each sub-machine system. Each sub-machine system acts as an electric machine. The sub-machine systems can be operated individually or in combination, depending on the requirements placed on the electric machine; the winding sections are correspondingly switched for this purpose. The switching between the winding sections is advantageously carried out mechanically with a contact disc.

13 Claims, 6 Drawing Sheets

(56) References Cited

U.S. PATENT DOCUMENTS

| | | | |
|---|---|---|---|
| 2011/0187242 A1* | 8/2011 | Takeuchi | H02K 11/00 |
| | | | 310/90 |
| 2012/0194030 A1* | 8/2012 | Brown | H02K 11/33 |
| | | | 310/254.1 |
| 2012/0294716 A1* | 11/2012 | Roesmann | H02P 25/024 |
| | | | 416/1 |
| 2014/0103850 A1 | 4/2014 | Frank | |
| 2016/0104992 A1 | 4/2016 | Hammond | |
| 2017/0366115 A1 | 12/2017 | Akutsu et al. | |

FOREIGN PATENT DOCUMENTS

| | | |
|---|---|---|
| CN | 104967268 A | 10/2015 |
| CN | 105576870 A | 5/2016 |
| CN | 105916630 A | 8/2016 |
| CN | 106712424 A | 5/2017 |
| EP | 3595165 | 1/2000 |
| EP | 1775823 | 4/2007 |
| GB | 1385330 | 2/1975 |
| NL | 2017030 | 1/2018 |

\* cited by examiner

ELECTRIC MACHINE AND METHOD FOR OPERATING THE SAME

CROSS-REFERENCE TO RELATED APPLICATIONS

This application is the U.S. National Phase of PCT Appln. No. PCT/DE2019/101015, filed Nov. 27, 2019, which claims priority to DE 102018131412.4, filed Dec. 7, 2018, and DE 102019101964.8, filed Jan. 28, 2019, the entire disclosures of which are incorporated by reference herein.

TECHNICAL FIELD

The disclosure relates to an electric machine, having a stator and rotor. The disclosure also relates to a corresponding method for operating such an electric machine.

BACKGROUND

Electric machines with stator and rotor are known for use as motors as well as generators. There are also electric machines that can be operated as both a motor and a generator. In the case of electric machines, the stator and rotor can have a fixed, predetermined configuration. In particular, the phases of the electric machine, and thus for example the stator windings of the electric machine that correspond to the phases, can be connected together in a predetermined manner. An adaptation of the electric machine to widely varying requirements is practically impossible in this case; the electric machine is at best optimized for one operating point. To increase the flexibility of the electric machine, electronic devices can be provided in large numbers. This leads to high costs and many additional assemblies, each of which carries a certain risk of failure so that overall the susceptibility of the electric machine to faults is increased.

SUMMARY

The object of the disclosure is therefore to create an electric machine which has a high degree of flexibility but is less susceptible to errors. A corresponding method for operating the electric machine should also be specified.

This object is achieved with regard to the electric machine by an electric machine having one or more of the features described herein, and with regard to the method by a method having one or more of the features described herein.

Advantageous configurations are described below and in the claims.

The electric machine according to the disclosure has a stator and a rotor. The electric machine is supplied with power via one or more phases. The rotor and/or the stator have corresponding windings in a manner known in principle; for example, a permanent magnet synchronous machine has permanent magnets on the rotor and windings on the stator.

According to the disclosure, however, the windings on the stator or on the rotor are divided into separately switchable winding sections for each phase. These winding sections are connected together and can be connected together in such a way that the electric machine is subdivided into sub-machine systems, with each sub-machine system being assigned a winding section for each phase. Each sub-machine system can act as an electric machine. Several sub-machine systems can also be interconnected. In this way, a high degree of flexibility is achieved, since the sub-machine systems can be used depending on the requirements placed on the electric machine. The interconnection of the sub-machine systems, that is to say, more specifically, the interconnection of the winding sections of the sub-machine systems both within a sub-machine system and between different sub-machine systems, can take place via a switching element, whereby the susceptibility to errors is kept within limits.

If, for example, and without restricting the disclosure thereto, a three-phase permanent magnet synchronous machine is considered, the rotor carries permanent magnets and the stator carries windings for each of the three phases. The winding for each phase is now divided into a number, approximately, and without limitation, four winding sections. The winding sections are connected together in such a way that four sub-machine systems result, each sub-machine system comprising a total of three winding sections, one winding section per phase. The winding sections of a sub-machine system, including the associated stator regions and the rotor of the electric machine, can each be understood as a separate electric machine. This is what is understood as a sub-machine system in the context of this application. The individual sub-machine systems can be interconnected together due to the ability to connect together of the winding sections. Analogous statements apply to other types of electric machines, such as a rotor with windings and a permanently excited stator.

In an advantageous embodiment, each sub-machine system is optimized for a different operating point. As a result, there is an optimized sub-machine system for each of these operating points and thus an electric machine that is optimized for the operating point. An operating point is characterized, for example, by a specific required speed of the rotor of the electric machine and a specific torque to be generated by the electric machine. The optimization of the electric machine for an operating point includes that the electric machine has a maximum efficiency at the operating point compared to the efficiency at other operating points. By interconnecting several sub-machine systems as required, the electric machine can be adapted to other operating situations.

In one embodiment, the switching operations between winding sections, and thus the switching operations for connecting together the winding sections take place mechanically, preferably by a single switching element or a small number of switching elements. This switching element can be designed in a correspondingly reliable manner, whereby the susceptibility of the electric machine to faults can be further reduced. In a particularly preferred embodiment, the mechanical switching takes place between the winding sections by means of a contact disc. This disc has groups of contacts on at least one side, each group representing a different type of interconnection together between the winding sections. Depending on the desired interconnection between winding sections, contacts of these winding sections are brought into an electrically conductive connection with the corresponding group of contacts on the contact disc. The interconnection options can be increased if the contact disc has contacts on both sides for contacting winding sections.

If the winding sections to be switched are located in the rotor, the contact disc can, for example, rotate therewith. In addition, or as an alternative, the coupling can take place via sliding contacts or via inductive or capacitive transmission.

In a certain sense, the contact disc replaces at least part of the winding heads, since very complex links can be represented by the contact disc, in particular if it has contacts on both sides. With an optimal design, the installation space freed up by the omitted winding heads is sufficient for the contact disc and the mechanics for their actuation. If waveguide cooling is also to be installed, contact cannot be made with the finished end face of a conductor, for example, but rather intermediate elements that are electrically connected to the conductor.

The switchover between different interconnections of the winding sections is preferably performed without current or voltage, at least at significantly lower voltages and currents than occur at most during operation in the electric machine. In the case of electric machines with permanent magnets, a device is provided for this purpose in embodiments by means of which at least one permanent magnet of the electric machine can be temporarily demagnetized. The device is also designed to remagnetize a demagnetized permanent magnet. In embodiments, it can be sufficient, instead of a complete demagnetization, only to reduce the magnetization of the permanent magnet and to increase it accordingly again later. The device just mentioned would also be designed accordingly.

The method according to the disclosure for operating an electric machine relates to an electric machine according to the disclosure in accordance with the description above and the description below. According to the disclosure, the winding sections of the sub-machine systems are switched in such a way that one or more of the sub-machine systems are operated, respectively depending on the requirements placed on the electric machine.

In one embodiment, the circuit between the winding sections takes place mechanically by means of a contact disc. The circuit between the winding sections of the electric machine comprises at least the following steps:

First, the contact disc is displaced in the direction of an axis of rotation of the contact disc to interrupt an electrically conductive connection between contacts of the contact disc and at least one winding section of at least one sub-machine system. The contact disc is then rotated about the axis of rotation of the contact disc to select a type of interconnection between the winding sections of the sub-machine systems. Finally, the contact disc is displaced in the direction of the axis of rotation of the contact disc to produce an electrically conductive connection between contacts of the contact disc and at least one winding section of at least one sub-machine system. The previous rotation brought the corresponding contacts on the contact disc into the correct position to make contact with the respective winding section during the subsequent shift.

To enable current and voltage-free switching between different interconnections of the winding sections of the electric machine, in one embodiment at least one permanent magnet of the electric machine is first demagnetized for the switching. Then the actual switchover takes place as described above. Then, at least one permanent magnet of the electric machine is magnetized. This can be the same permanent magnet that was previously demagnetized or a different permanent magnet. Here, too, demagnetization includes a reduction in magnetization.

In a further development, the demagnetization and the magnetization are carried out by at least one rotating magnet. For example, permanent magnets of a rotor with alternating polarization run past the rotating magnet. This magnet rotates in a synchronized manner with the rotor in such a way that its polarization is opposite to that of the rotor magnet that is just passing by. In this way, the magnetization of the rotor magnet is reduced. The rotor magnets can be remagnetized by a further rotating magnet, the rotation of which is synchronized with the rotation of the rotor in such a way that its polarization has the direction of the polarization to be imparted to the rotor magnet moving past. The synchronization between the rotor and the rotating magnets can take place, for example, via gears which couple the rotor with the rotating magnets, or via actuators for the rotating magnets.

BRIEF DESCRIPTION OF THE DRAWINGS

The disclosure and the advantages thereof are explained in more detail below with reference to the accompanying schematic drawings.

DETAILED DESCRIPTION

The drawings relate only to exemplary embodiments of the disclosure, which are explained for a better understanding. The drawings and the associated description are in no way to be interpreted as a limitation of the disclosure to the embodiments described therein.

Figure 1:
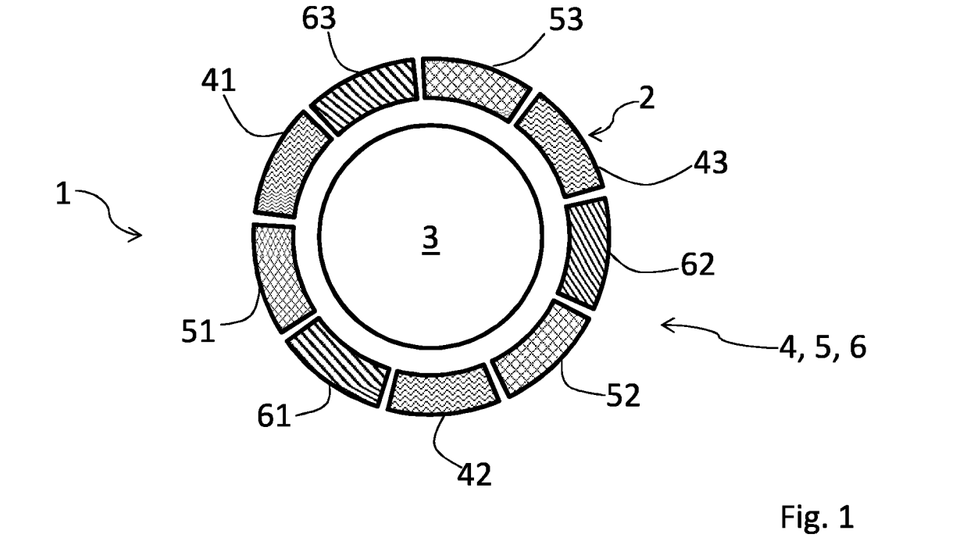
FIG. 1 shows schematically an electric machine according to the disclosure.

FIG. 1 schematically shows an electric machine 1 according to the disclosure with a stator 2 and rotor 3. Electric lines to the electric machine 1 are not shown here; the electric machine 1 shown is a three-phase electric machine 1. The stator 2 comprises windings which are divided into winding sections 41, 42, 43, 51, 52, 53, 61, 62, 63. The winding sections 41, 51, 61 are sections of the winding for the first phase. The winding sections 42, 52, 62 are sections of the winding for the second phase. The winding sections 43, 53, 63 are sections of the winding for the third phase. The electric machine 1 is divided into three sub-machine systems 4, 5, 6. Winding sections 41, 42, 43 and rotor 3 are essential components of the sub-machine system 4. Winding sections 51, 52, 53 and rotor 3 are essential components of the sub-machine system 5. Winding sections 61, 62, 63 and rotor 3 are essential components of the sub-machine system 6. Each sub-machine system 4, 5, 6 therefore comprises the rotor 3 and one winding section for each of the three phases. Each sub-machine system 4, 5, 6 can act as an electric machine on its own. Through suitable interconnection between the winding sections 41, 42, 43, 51, 52, 53, 61, 62, 63, individual sub-machine systems 4, 5, 6 are selected, two of the sub-machine systems 4, 5, 6 are selected, or all three sub-machine systems 4, 5, 6 are selected to contribute to the effect of the electric machine 1 in a certain requirement situation for the electric machine 1. Furthermore, the suitable circuit between the winding sections 41, 42, 43, 51, 52, 53, 61, 62, 63 also enables different switching topologies to be implemented within a sub-machine system 4, 5, 6. The possibility of switching between the winding sections 41, 42, 43, 51, 52, 53, 61, 62, 63 thus results in a high degree of flexibility and adaptability of the electric machine 1 to varying requirements.

Figure 2:
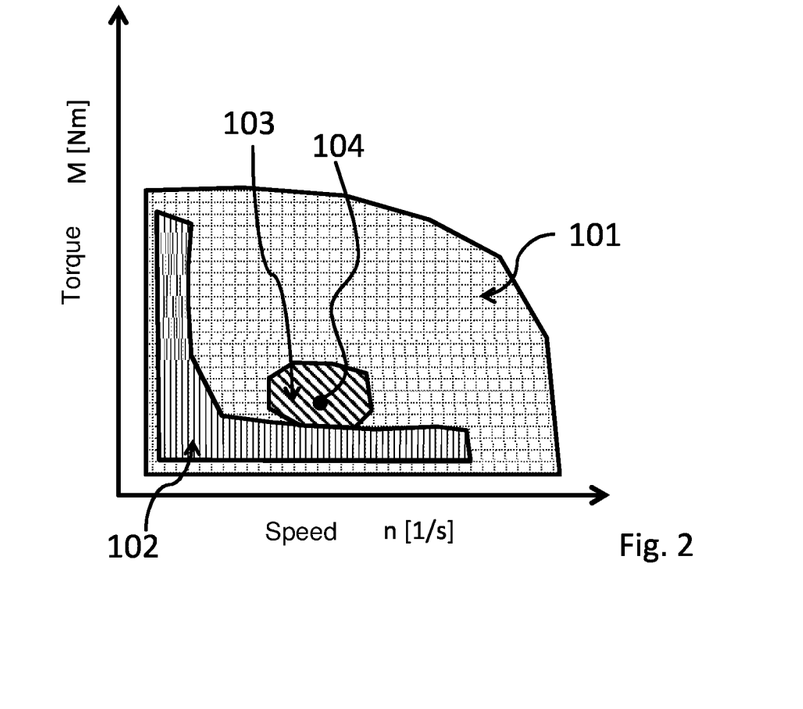
FIG. 2 schematically shows the probability of an electric machine being present at different operating points during operation.

FIG. 2 schematically shows, in an example of the operation of an electric machine, the probability of being present at different operating points; the operating points are characterized by the speed n of the electric machine and the torque M of the electric machine. At operating points in a region 101, the electric machine is only present with a low probability during operation, for example a total probability of 10%. The electric machine is more likely to be at operating points in a region 102 during operation; the probability of being in the region 102 can be, for example, 30%. The electric machine is very likely to be at operating points in a region 103 during operation; the probability of being in the region 103 can be 60%, for example. It can be the case that the probability of being at an operating point 104 is at a maximum. The primary goal of the design of the electric machine should be to optimize the electric machine for operation in region 103, possibly for operation at point 104; in particular, the generally operating point-dependent efficiency of the electric machine should be at a maximum in region 103, possibly at point 104. In addition, the electric machine could advantageously be designed in such a way that it can reach the maximum speed, for example by means of adjustable magnets.

In an electric machine according to the disclosure, one of the sub-machine systems, for example sub-machine system 4 in the example of electric machine 1 from FIG. 1, can be optimized for operation at operating point 104 or in region 103. The sub-machine system 5 could then be optimized for operation in another region, for example 102, if active, wherein, for example, the sub-machine system 4 higher speeds are reached outside the region 103 without any torque contribution, but also without disturbing the effect of the sub-machine system 5. The sub-machine systems are preferably operated in regions outside the respective field weakening region.

Figure 3:
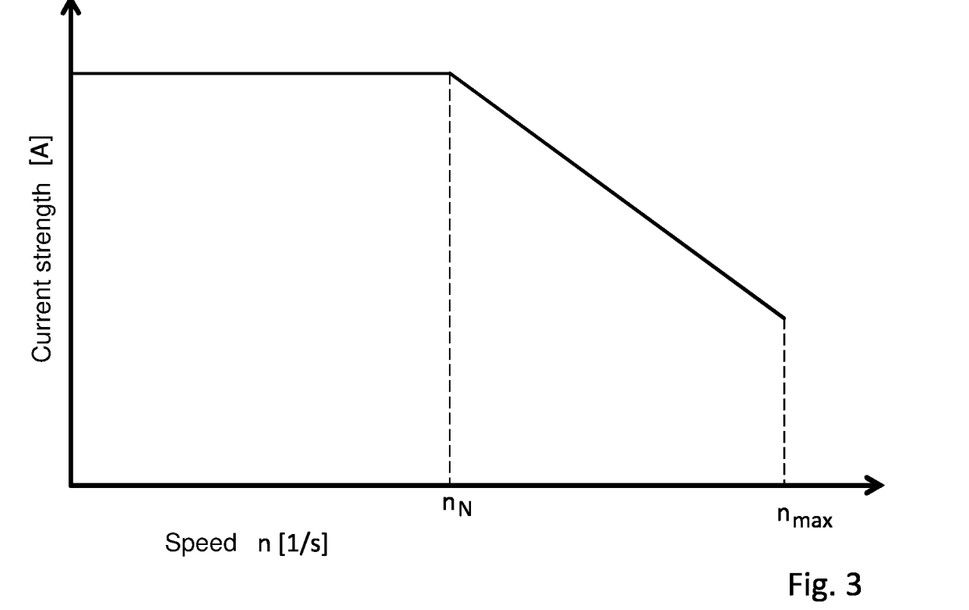
FIG. 3 shows schematically the occurrence of a field weakening.

FIG. 3 schematically shows the occurrence of the field weakening in a diagram in which the current strength in the windings of the electric machine is plotted against the speed of the electric machine. This is shown by a decrease in the current intensity at speed values greater than $n_N$. The sub-machine systems of the electric machine according to the disclosure are preferably optimized for operation outside of the occurrence of the field weakening.

Figure 4:
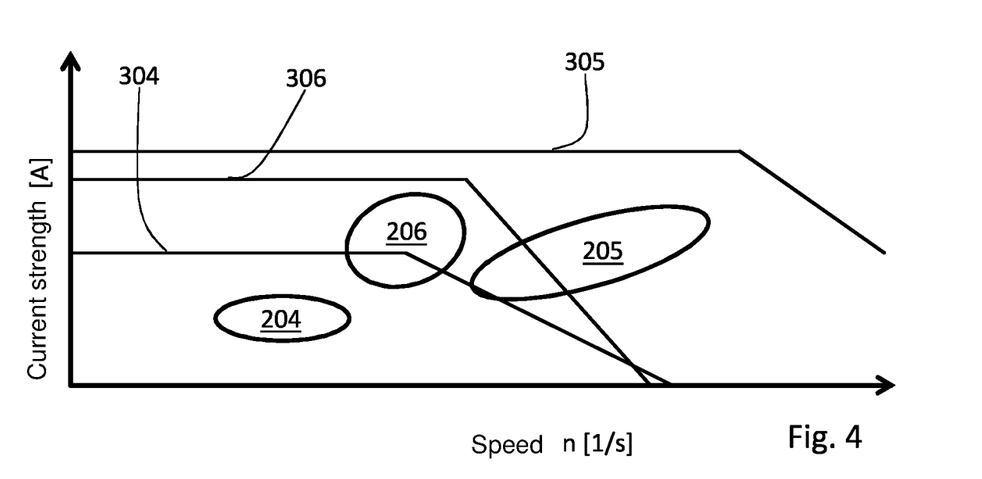
FIG. 4 shows optimal application regions of various sub-machine systems.

In a diagram analogous to FIG. 3, FIG. 4 shows application regions 204, 205, 206, for which the sub-machine systems 4, 5, 6 (see FIG. 1) are respectively optimized, as well as corresponding curves 304, 305, 306 of the current intensities depending on the speed of the electric machine 1 (see FIG. 1) and thus also of the respective subsystem 4, 5, 6. More precisely, application region 204 and curve 304 relate to sub-machine system 4, application region 205 and curve 305 to sub-machine system 5, application region 206 and curve 306 to sub-machine system 6.

If the electric machine 1 is to be operated, for example, in a speed range which corresponds to the region 204, it can be sufficient to operate the sub-machine system 4 alone. If higher speeds are required, it can be sufficient to operate sub-machine system 5 alone. If higher torques are required in each case, then sub-machine system 6 can also be operated. Of course, other combinations of the sub-machine systems and other optimal application regions of the individual sub-machine systems are also conceivable. If the interconnection of the winding sections of the sub-machine system is changed in one of the sub-machine systems, then sub-machine systems that remain, i.e., that are not in the process of switching, can take over the load that occurs during this switching process.

Figure 5:
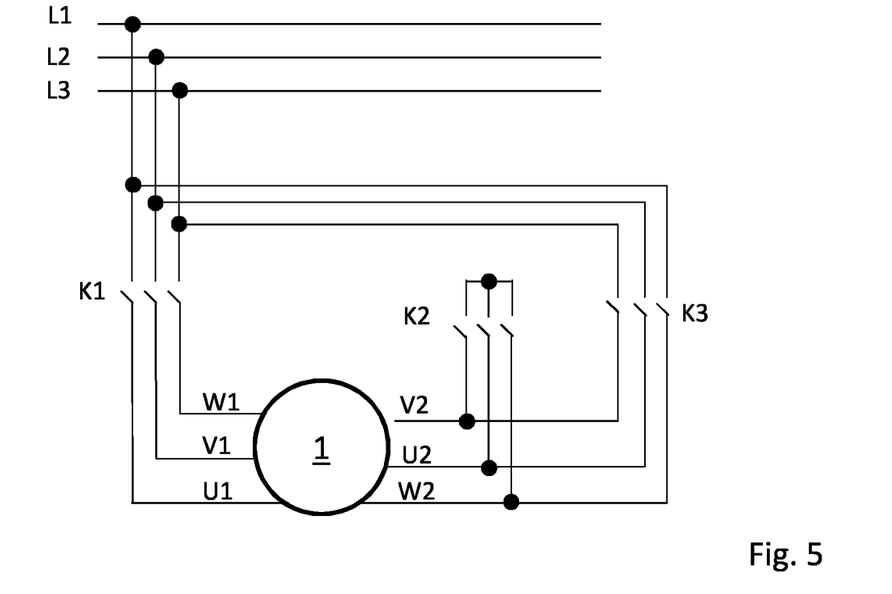
FIG. 5 schematically shows a circuit for optionally wiring an electric machine differently.

FIG. 5 schematically shows a circuit for wiring an electric machine 1 in different ways, as desired. According to the same principle, individual sub-machine systems 4, 5, 6 (see FIG. 1) of the electric machine 1 according to the disclosure can also be wired differently.

The electric machine 1 shown is three-phase and is supplied with current via three external conductors L1, L2, L3. The switches K1 serve to establish or disconnect a connection between the electric machine 1 and the network. Contacts W1, V1, U1 and V2, U2, W2 are provided on the electric machine 1. By closing the switch K3 and opening the switch K2, a delta connection is achieved for the electric machine 1. A star connection for the electric machine 1 is achieved by closing the switch K2 and opening the switch K3.

Figure 6:
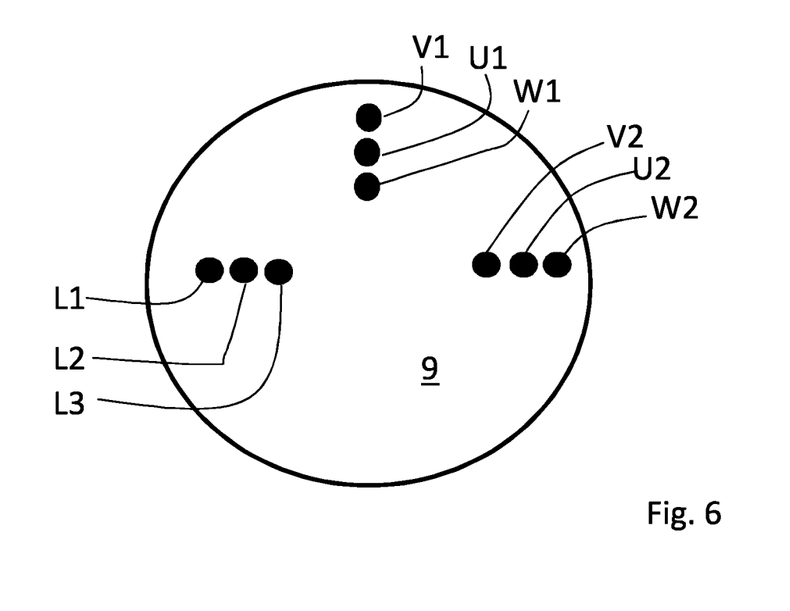
FIG. 6 shows an arrangement of contacts of the electric machine for interaction with a contact disc.
Figure 7:
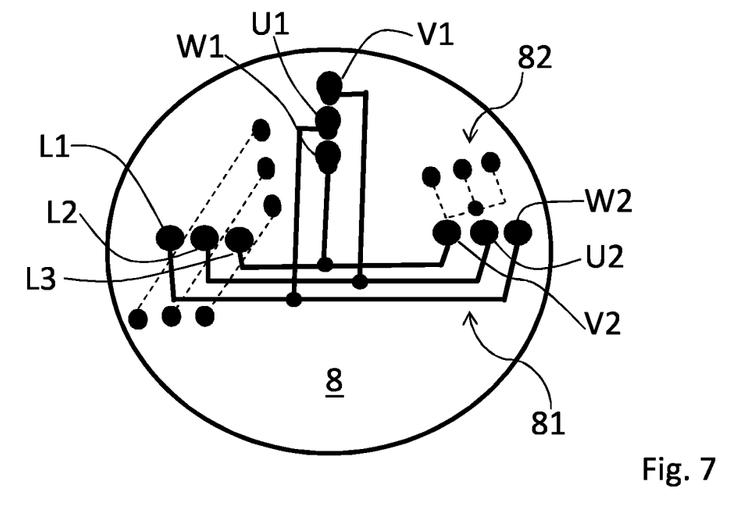
FIG. 7 shows contacts of a contact disc in a switching position.
Figure 8:
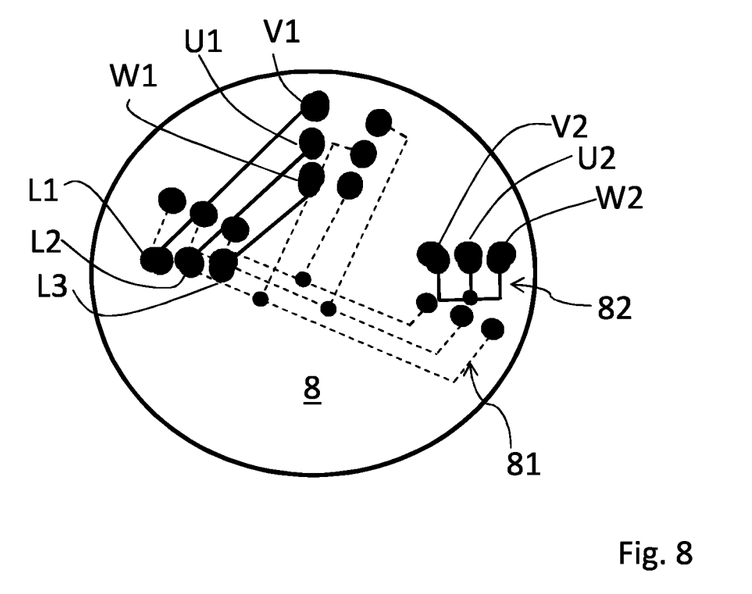
FIG. 8 shows contacts of the contact disc from FIG. 7 in a further switching position.

FIG. 6 shows, in the designations of FIG. 5, an arrangement of contacts of the electric machine for interaction with a contact disc (see FIGS. 7 and 8). The contacts are arranged here in a contact region 9.

FIG. 7 shows contacts 81, 82 on a contact disc 8, which contact the contacts shown in FIG. 6 in a switching position in which there is a delta connection for the electric machine 1. In this switching position, the contacts 81 are active, that is, in electrically conductive connection with the contacts shown in FIG. 6; the electrically conductive connections between the contacts 81 are shown in solid lines. The contacts 82 are inactive, that is, not in electrically conductive connection with the contacts shown in FIG. 6; the electrically conductive connections between the contacts 82 are shown in dashed lines. The contacts 81, 82 can be guided and sprung individually.

FIG. 8 shows the contacts 81, 82 on the contact disc 8 from FIG. 7, which contact the contacts shown in FIG. 6 in a further switching position in which there is a star connection for the electric machine 1. In this switching position, the contacts 82 are active, that is, in electrically conductive connection with the contacts shown in FIG. 6; the electrically conductive connections between the contacts 82 are shown in solid lines. The contacts 81 are inactive, that is, not in electrically conductive connection with the contacts shown in FIG. 6; the electrically conductive connections between the contacts 81 are shown in dashed lines.

The switching position shown in FIG. 8 results from the switching position shown in FIG. 7 ultimately by rotating the contact disc 8 about an axis perpendicular to the plane of the drawing. In the meantime, the contact disc 8 is shifted perpendicular to the plane of the drawing.

The changeover between a delta connection and a star connection shown with reference to FIGS. 7 and 8 is an example for explaining the changeover by means of a contact disc. Depending on the configuration of the groups of contacts on the contact disc, other or further circuit types can be implemented.

Figure 9:
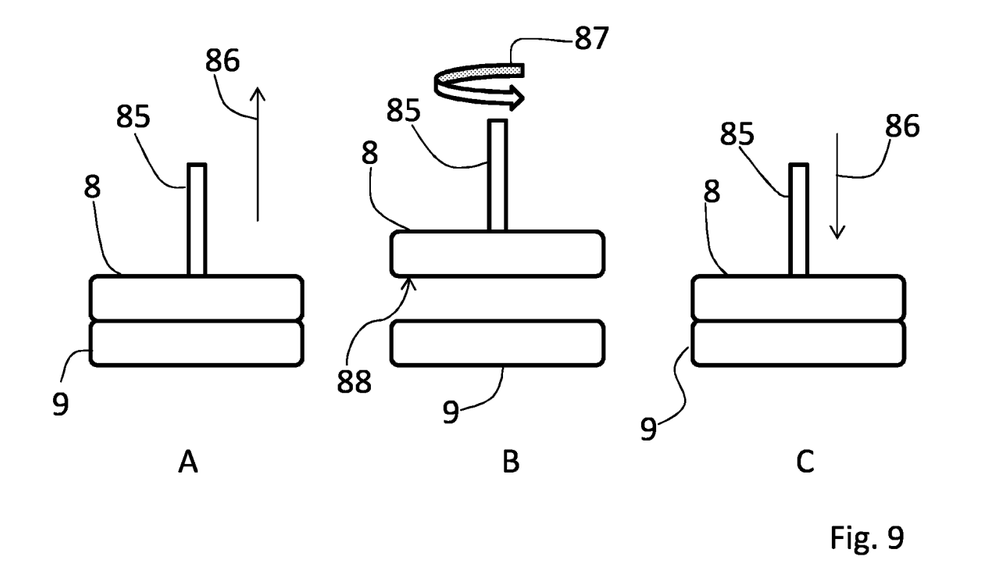
FIG. 9 shows the process of changing the switching position by means of a contact disc.

FIG. 9 schematically shows the change of a switching position using a contact disc 8. The contact disc shown has contacts on one side 88, as shown for example in FIG. 7 or FIG. 8. In stage A, contacts of the contact disc 8 are in an electrically conductive connection with contacts of the contact region 9. The contact region 9 is of course part of the electric machine, but no further components thereof are shown here; electric lines to the contact region 9 are also not shown. By moving the contact disc 8 away from the contact region 9 in the direction 86 of an axis of rotation 85 of the contact disc 8, the electrically conductive connection between contacts of the contact disc 8 and contacts of the contact region 9 is interrupted, and one arrives at stage B. In stage B, a rotation 87 takes place about the axis of rotation 85. In this way, other contacts of the contact disc 8 are brought into the correct angular position with respect to the contacts on the contact region 9 and one arrives at stage C. In stage C, the contact disc 8 is moved in the direction 86 along the axis of rotation 85 of the contact disc 8 towards the contact region 9, and thus an electrically conductive connection is established between the contacts in the contact region 9 and the contacts of the contact disc 8 correctly positioned by the rotation 87. For example, the transition from the switch position shown in FIG. 7 to the switch position shown in FIG. 8 can thus be carried out. In the example shown, the contact disc 8 has a physical axis of rotation 85 via which the contact disc 8 can be rotated. Such a physical axis of rotation 85 does not, however, constitute a limitation of the disclosure; a rotation of the contact disc could also be effected in other ways, for example by acting on an edge region of the contact disc; in this case too, however, there would be a geometric axis of rotation, and the direction 86 would be defined accordingly.

Figure 10:
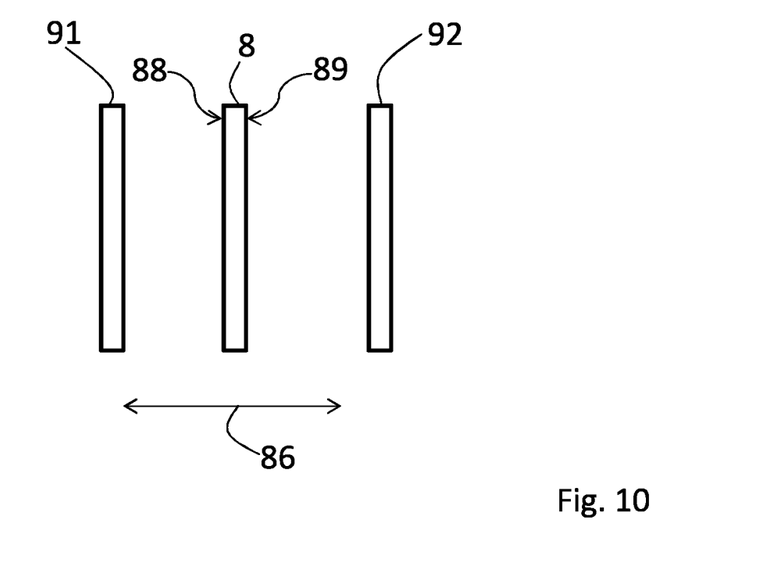
FIG. 10 shows the use of a contact disc that carries contacts on both sides.

FIG. 10 shows a contact disc 8 which carries contacts on both sides, that is to say on one side 88 and on an opposite side 89. The contact disc 8 is provided for interaction with two contact regions 91, 92. The contact regions 91, 92 each carry contacts as shown, for example, in FIG. 6. By shifting the contact disc 8 in the direction 86, contacts on the side 88 can enter into an electrically conductive connection with contacts on the contact carrier 91, or contacts on the side 89 can enter into an electrically conductive connection with contacts on the contact carrier 92. In addition, rotations of the contact disc 8 are also possible here, analogously to FIG. 9. A contact disc 8 with contacts on both sides, 88, 89 offers the possibility of realizing a larger number of switching options between the winding sections of the electric machine.

Figure 11:
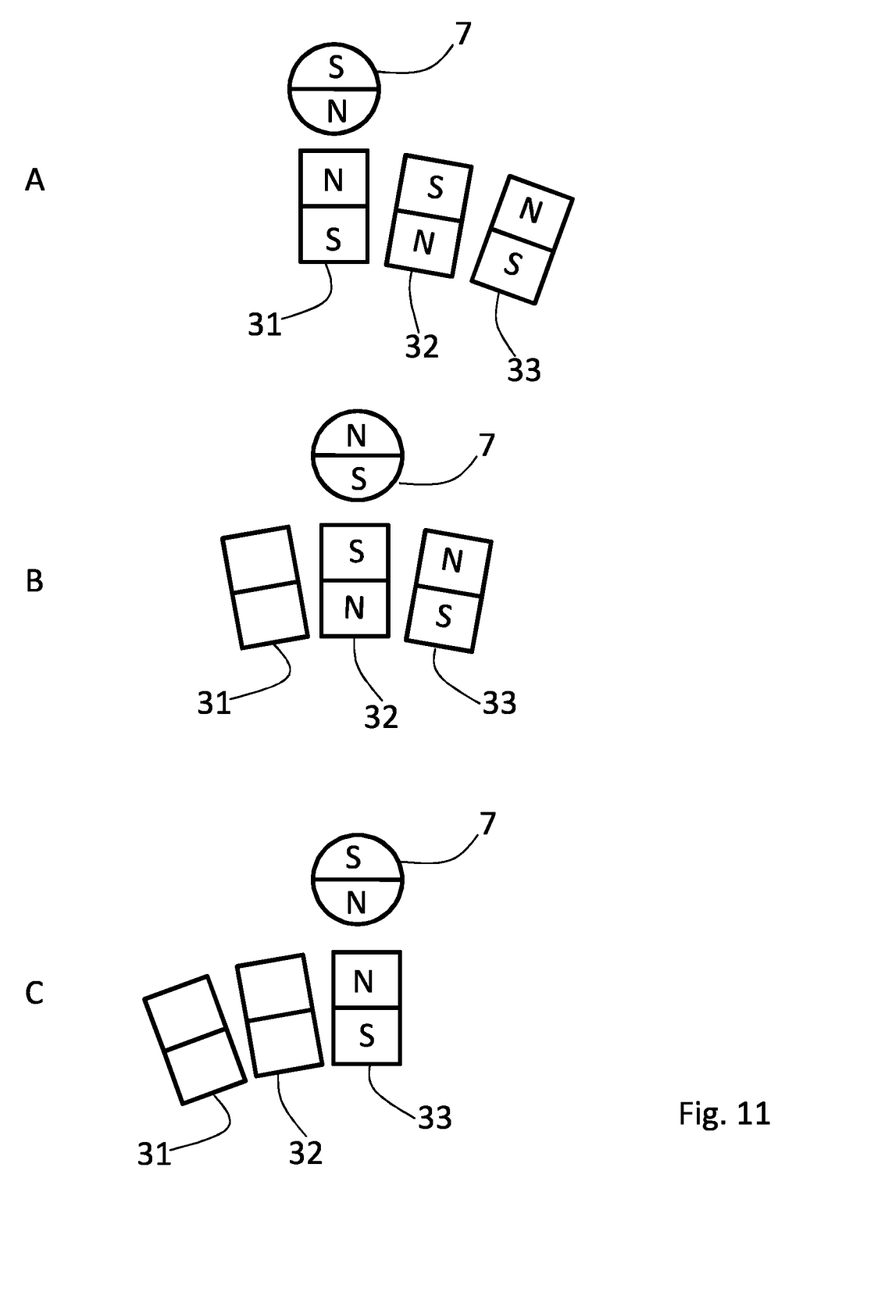
FIG. 11 shows the demagnetization of rotor magnets.

FIG. 11 shows the demagnetization of rotor magnets by means of a rotating magnet 7. Three rotor magnets 31, 32, 33 are shown by way of example; The position of the north pole "N" and the south pole "S" is given for all magnets. In stage A, the rotor magnet 31 lies opposite the rotating magnet 7. It can be seen that the rotor magnet 31 and magnet 7 have opposite polarizations so that the rotor magnet 31 is demagnetized. In stage B, the rotor magnet 31 is demagnetized, and the rotor magnet 32 lies opposite the rotating magnet 7. Since the magnet 7 rotates, the polarizations of magnet 7 and rotor magnet 32 are now opposite. As a result, the rotor magnet 32 is demagnetized, as shown for stage C, in which the rotor magnet 33 is now opposite the rotating magnet 7. Again, the magnetic polarizations of rotating magnet 7 and rotor magnet 33 are opposite. The rotation of the rotating magnet 7 is matched to the rotation of the rotor in such a way that the polarizations of the rotating magnet 7 and this opposite rotor magnet are always opposite to one another.

If demagnetized rotor magnets are to be magnetized again, this can be done by moving them past a rotating magnet, as shown in FIG. 11. Its polarization is then directed in such a way that it is parallel to the polarization to be given to the respective rotor magnet.

In FIG. 11 rotating magnet 7 and rotor magnets 31, 32, 33 are directly opposite one another. However, it is also conceivable to provide a guide element for the magnetic flux between the rotating magnet and the rotor magnets. In this case, the rotation of the rotating magnet would have to be coordinated with the rotation of the rotor so that the end of the guide element opposite a rotor magnet to be demagnetized has a polarity which is the same as the polarity of the pole of the rotor magnet closest to the guide element.

If demagnetization or remagnetization of the rotor magnets is not required, the rotating magnets and/or the associated guide elements can be removed from the rotor, for example by a displacement or a pivoting movement.

Other approaches to demagnetizing and remagnetizing rotor magnets are also conceivable.

LIST OF REFERENCE SYMBOLS

1 Electric machine
2 Stator
3 Rotor
4, 5, 6 Sub-machine systems
7 Rotating magnet
8 Contact disc
9 Contact region
31, 32, 33 Rotor magnet
41, 42, 43 Winding section
51, 52, 53 Winding section
61, 62, 63 Winding section
81, 82 Contacts of the contact disc
85 Rotational axis
86 Direction
88, 89 Side of the contact disc
91, 92 Contact region
101 Region
102 Region
103 Region
104 Operating point
204 Region
205 Region
206 Region
304 Curve
305 Curve
306 Curve

The invention claimed is:

1. An electric machine, comprising:
a stator;
a rotor including a plurality of rotor magnets;
a plurality of sub-machine systems formed by dividing windings for each phase on the stator or on the rotor into separately switchable winding sections, each said winding section being assigned to each said respective sub-machine system for each said phase and each said sub-machine system being configured to act as an electric machine; and
at least one permanent magnet that is configured for temporary demagnetization of at least one of the plurality of rotor magnets, wherein rotation of the at least one permanent magnet is matched with rotation of the rotor such that polarization of the at least one permanent magnet and the plurality of rotor magnets are opposite to one another.

2. The electric machine according to claim 1, wherein each said sub-machine system is optimized for a different operating point.

3. The electric machine according to claim 1, wherein switching operations between said winding sections take place mechanically.

4. The electric machine according to claim 3, further comprising a contact disc by which the mechanical switching between the winding sections takes place.

5. The electric machine according to claim 4, wherein the contact disc carries contacts on both sides for contacting the winding sections.

6. The electric machine according to claim 1, wherein demagnetization comprises at least reducing the magnetization of at least one of the plurality of rotor magnets compared to before demagnetization.

7. A method for operating an electric machine comprising a stator, a rotor, and a plurality of sub-machine systems formed by dividing windings for each phase on the stator or on the rotor into separately switchable winding sections, each said winding section being assigned to each said respective sub-machine system for each said phase and each said sub-machine system being configured to act as an electric machine, the method comprising:
  switching the winding sections of the sub-machine systems such that one or more of the sub-machine systems are operated, respectively depending on at least one of speed and torque requirements for the electric machine;
  wherein a connection between the winding sections takes place mechanically by a contact disc, and the connection between the winding sections of the electric machine comprises the following steps:
    moving the contact disc axially in a direction along an axis of rotation of the contact disc to interrupt an electrically conductive connection between contacts of the contact disc and at least one said winding section of at least one said sub-machine system;
    rotating the contact disc about the axis of rotation of the contact disc to select a type of interconnection between the winding sections of the sub- machine systems; and
    moving the contact disc axially in the direction along the axis of rotation of the contact disc to establish an electrically conductive connection between contacts of the contact disc and at least one said winding section of at least one said sub-machine system;
  wherein for switching between the winding sections of the electric machine initially demagnetizing at least one permanent magnet of the electric machine, and then magnetizing the at least one permanent magnet of the electric machine, wherein the demagnetizing comprises at least reducing the magnetization of the permanent magnet compared to before demagnetization of the permanent magnet.

8. The method according to claim 7, further comprising carrying out the demagnetization and the magnetization by at least one rotating magnet.

9. An electric machine, comprising:
  a stator;
  a rotor, wherein the stator includes three sub-machine systems comprising separately switchable winding sections for each phase, and each of the three sub-machine systems being configured to act as an electric machine, and wherein the three sub-machine systems comprises a first sub-machine system, a second sub-machine system, and a third sub-machine system consecutively arranged in a repeating pattern around an outer surface of the rotor; and
  at least one permanent magnet, and a device for temporary demagnetization of the at least one permanent magnet, wherein demagnetization comprises at least reducing the magnetization of the permanent magnet compared to before demagnetization of the permanent magnet.

10. The electric machine according to claim 9, wherein each said sub-machine system is optimized for a different operating point.

11. The electric machine according to claim 9, further comprising a mechanical switch for switching between said winding sections.

12. The electric machine according to claim 11, wherein the mechanical switch comprises a contact disc.

13. The electric machine according to claim 12, wherein the contact disc includes contacts on both sides for contacting the winding sections.

* * * * *